US009083848B2

(12) United States Patent
Ok

(10) Patent No.: US 9,083,848 B2
(45) Date of Patent: Jul. 14, 2015

(54) SPEAKER DISPLAYING METHOD AND VIDEOPHONE TERMINAL THEREFOR

(75) Inventor: Eul Seok Ok, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 565 days.

(21) Appl. No.: 13/325,255

(22) Filed: Dec. 14, 2011

(65) Prior Publication Data

US 2012/0287218 A1 Nov. 15, 2012

(30) Foreign Application Priority Data

May 12, 2011 (KR) .......................... 10-2011-0044401

(51) Int. Cl.
*H04N 7/14* (2006.01)
*H04N 7/15* (2006.01)

(52) U.S. Cl.
CPC ....................................... *H04N 7/15* (2013.01)

(58) Field of Classification Search
CPC .................. H04M 2203/35–2203/359; H04M 2203/50–2203/509
USPC .................. 348/14.01–14.16; 370/259–271, 370/351–357; 709/201–207, 217–248; 379/201.01, 202.01–207.01
See application file for complete search history.

(56) References Cited

U.S. PATENT DOCUMENTS

| 5,745,161 | A * | 4/1998 | Ito ............................... 348/14.09 |
| 6,496,201 | B1 * | 12/2002 | Baldwin et al. ............... 715/753 |
| 6,744,460 | B1 * | 6/2004 | Nimri et al. ................. 348/14.11 |
| 6,853,716 | B1 * | 2/2005 | Shaffer et al. ............ 379/202.01 |
| 6,906,741 | B2 * | 6/2005 | Canova et al. ............. 348/14.08 |
| 7,081,915 | B1 * | 7/2006 | Hamilton ................... 348/14.08 |
| 7,920,761 | B2 * | 4/2011 | Amir et al. .................... 382/305 |
| 8,050,917 | B2 * | 11/2011 | Caspi et al. .................... 704/238 |
| 8,144,939 | B2 * | 3/2012 | Thorn .......................... 382/115 |
| 8,155,394 | B2 * | 4/2012 | Allegra et al. ................. 382/115 |
| 2002/0054047 | A1 * | 5/2002 | Toyama et al. ............... 345/629 |
| 2002/0093531 | A1 * | 7/2002 | Barile ........................... 345/753 |
| 2002/0101505 | A1 * | 8/2002 | Gutta et al. ................. 348/14.07 |
| 2003/0073430 | A1 * | 4/2003 | Robertson et al. ............ 455/416 |
| 2007/0188596 | A1 * | 8/2007 | Kenoyer .................... 348/14.08 |
| 2008/0088698 | A1 * | 4/2008 | Patel et al. ................. 348/14.09 |
| 2009/0201313 | A1 * | 8/2009 | Thorn .......................... 345/620 |
| 2010/0085415 | A1 * | 4/2010 | Rahman ..................... 348/14.08 |

* cited by examiner

Primary Examiner — Hemant Patel

(74) Attorney, Agent, or Firm — Jefferson IP Law, LLP

(57) ABSTRACT

A speaker displaying method displaying who is a speaker while many users are performing a videophone call and a videophone terminal implementing the same are provided. The method includes detecting voice characteristic information of other characters when a videophone call starts so as to match the characteristic information with character images of a received image in a one-to-one correspondence, detecting voice characteristic information from a voice received after the matching, and displaying a character image matching the detected voice characteristic information distinguished from other character images.

10 Claims, 10 Drawing Sheets

SPEAKER DISPLAYING METHOD AND VIDEOPHONE TERMINAL THEREFOR

PRIORITY

This application claims the benefit under 35 U.S.C. §119(a) of a Korean patent application filed on May 12, 2011 in the Korean Intellectual Property Office and assigned Serial No. 10-2011-0044401, the entire disclosure of which is hereby incorporated by reference.

BACKGROUND OF THE INVENTION

1. Field of the Invention

The present invention relates to a speaker displaying method and a videophone terminal thereof. More particularly, the present invention relates to a speaker displaying method displaying who is a speaker while many users are performing a videophone call and a videophone terminal implementing the same.

2. Description of the Related Art

Most mobile communication terminals have a videophone call function. Videophone calls are increasing due to advances in wireless networks enabling a user to enjoy video communication at reduced cost.

However, in a case of a multi-party videophone call, it is difficult to determine who is speaking. To address this issue, the speaker is typically determined using time delay and intensity difference between voice signals sensed by a plurality of sensors or based on detected motion of a lip.

However, it is difficult to detect time delay and intensity difference and determine whether a motion of a lip is for speaking. This reduces accuracy of determining the current speaker.

SUMMARY OF THE INVENTION

Aspects of the present invention are to address at least the above-mentioned problems and/or disadvantages and to provide at least the advantages described below. Accordingly, an aspect of the present invention is to provide a method for displaying a speaker distinguished from a plurality of users and a videophone terminal implementing the same.

In accordance with an aspect of the present invention, a speaker display method of a videophone terminal is provided. The method includes detecting voice characteristic information of other characters when a videophone call starts so as to match the characteristic information with character images of a received image in a one-to-one correspondence, detecting voice characteristic information from a voice received after the matching, and displaying a character image matching the detected voice characteristic information distinguished from other character images.

In accordance with another aspect of the present invention, a videophone terminal is provided. The terminal includes a radio frequency communication unit for receiving an image and a voice, a controller for detecting voice characteristic information from the received voice, for detecting character characteristic information of character images from the received image, for matching the detected voice characteristic information with one of the detected character characteristic information, and for determining a corresponding character image of the matched character characteristic information as a speaker image of the received voice, a memory for storing the detected voice characteristic information and character characteristic information matching the detected voice characteristic information, and a display unit for displaying the determined speaker image distinguished from other character images.

In accordance with another aspect of the present invention, a videophone terminal is provided. The videophone terminal includes a communication unit for receiving data associated with a videophone call, a display unit for displaying at least one character image, each character image corresponding to a speaker in the videophone call, the display unit including a touch screen for receiving user input, a controller for detecting voice characteristic information from a received voice, for detecting character characteristic information corresponding to each of the at least one character image, for matching the voice characteristic information with character characteristic information corresponding to one of the at least one character image, and for determining the corresponding character image as a speaker image of the received voice, and a memory for storing the voice characteristic information and the character characteristic information matching the voice characteristic information, wherein the controller controls the display unit to display the character image corresponding to the speaker image differently than the other character images Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the term "voice characteristic information" denotes information for distinguishing voices from each other. Examples of the voice characteristic information include tone, frequency, or intensity. The term "character characteristic information" denotes information for distinguishing characters from each other. Examples of the character characteristic information include location information of a part of a body, such as a face or a lip, or location information of an entire contour of a character. The term "certain gesture" denotes a gesture acted by a speaker. Examples of the certain gesture include an action lifting a finger around a face in greeting, bowing a head in greeting, or a moving mouse shape. The term "template" denotes a standard image for detecting a face, a lip, or a certain gesture from an image. A videophone terminal according to an exemplary embodiment of the present invention compares a received image with a template to detect a face, a lip, a certain gesture, and so on. The template may be gray-processed or binarized.

The videophone terminal may be any of various types of information communication devices including camera and communication functions, such as a smart phone, a tablet PC, a notebook PC, and a desktop PC. Further, the videophone terminal may have a multi tasking function simultaneously performing various tasks. Hereinafter, it is assumed that the videophone terminal is a smart phone.

Figure 1:
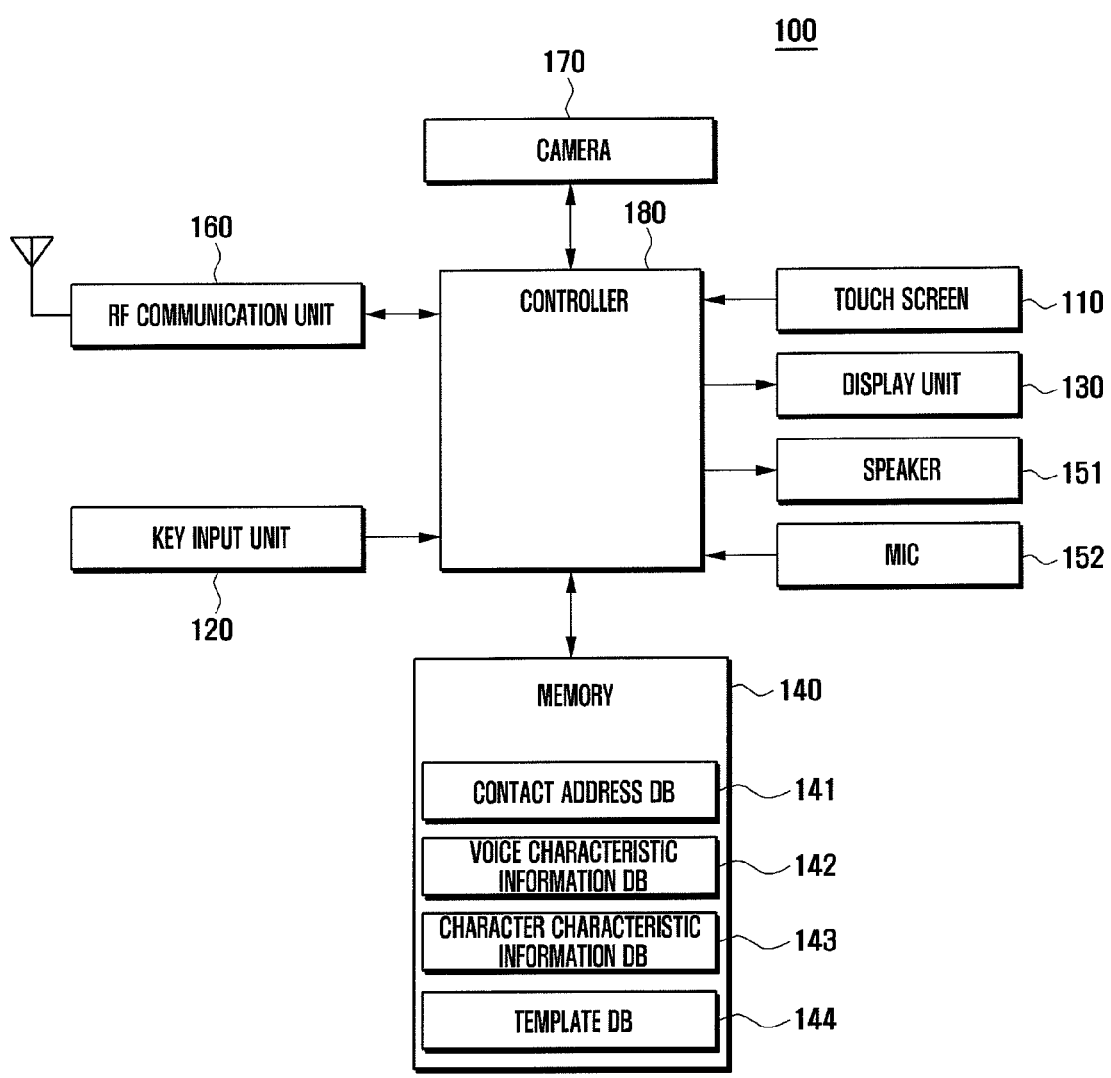
FIG. 1 is a block diagram illustrating a configuration of a videophone terminal according to an exemplary embodiment of the present invention.

FIG. 1 is a block diagram illustrating a configuration of a videophone terminal according to an exemplary embodiment of the present invention.

Referring to FIG. 1, the videophone terminal 100 may include a touch screen 110, a key input unit 120, a display unit 130, a memory 140, a speaker 151, a microphone 152, a radio frequency (RF) communication unit 160, a camera 170, and a controller 180. The videophone terminal 100 may include additional units not shown in FIG. 1 for purposes of clarity. Similarly, the functionality of two or more units may be integrated into a single component. For example, the functionality of the touch screen 110 may be integrated into the display unit 130.

The touch screen 110 transfers a touch signal to the controller 170. The touch signal may be divided into touch & drop, drag & drop, and flick & drop. Touch & drop denotes an operation of pushing one point with a finger and then separating the finger from the point. Drag denotes an operation of moving a finger along the touch screen 110 in one direction. Flick denotes an operation of moving a finger quickly and then separating the finger. The controller 180 may distinguish the flick from the drag based on moving speed. The touch screen 110 may be a resistive type, a capacitive type or a pressure type.

The key input unit 120 includes a plurality of keys for operation, and transfers a key signal to the controller 170. The key signal may be a power on/off signal, a volume control signal, a screen on/off signal.

The display unit 130 converts image data input from the controller 180 into an analog signal, and displays the converted analog signal. The display unit 130 displays a certain character image, such as a speaker image distinguished from another character image. For example, the display unit 130 may display an arrow shape, a name of the speaker, or a contour of the speaker image.

The display unit 130 may divide a screen into two areas, and display a main screen and a sub image on the two divided areas, respectively. The main screen may be one of a lock screen, a home screen, and an application execution screen. The lock screen is an image displayed when a screen of the display unit 130 is enlarged. When a certain touch operation occurs, the controller 180 switches an image displayed on the screen from the lock screen to the home screen or the application execution screen. The home screen is an image including a plurality of icons for executing an application. If the user touches and drops the icon, the controller 180 executes a corresponding application and switches a displayed image from the home screen to the application execution screen. For example, if the user touches & drops an icon for a videophone call, the controller 180 controls the display unit 130 to display a call execution screen on a main screen area. Meanwhile, a sub screen is an image including an application icon being executed or that a user frequently searches.

The memory 140 may store programs and data necessary for an operation of the videophone terminal 100, an operating system (OS), applications, images, audio data, or video data. The memory 140 includes a main storage unit and a secondary storage unit. The main storage unit may be configured by a flash memory and the secondary storage unit may be configured by a RAM.

The main storage unit is a space in which the OS and the application are loaded. When the videophone terminal 100 is booted, the OS is executed in a loaded state from the secondary storage unit to the main storage unit. The application is further executed in a loaded state from the secondary storage unit to the main storage unit. When execution of a corresponding application is terminated, the application is deleted from the main storage unit. The secondary storage unit is a space storing an Operating System (OS), various applications, and various data. The secondary storage unit may be divided into a data area and a program area. The data area may include a contact address DB 141, a voice characteristic information DB 142, a character characteristic information DB 143, and a template DB 144. The memory 140 stores voice characteristic information and character characteristic information mapped thereto. The memory 140 further stores a template for detecting a certain gesture, a face, and a lip.

The RF communication unit 160 transmits and receives signals associated with portable phone communication, a short message service (SMS), or a Multimedia Message Service (MMS), a voice call, and data communication. The RF communication unit 160 converts voice/sound data and control data into RF signals and transmits the RF signals. The RF communication unit 160 receives and converts an RF signal into voice/sound data and control data and outputs the voice/sound data and the control data. The RF communication unit 160 includes an RF transmitter for up-converting a frequency of a signal for transmission and amplifying the signal, and an RF receiver for low-noise-amplifying a received signal and down-converting a frequency of the signal.

The camera 170 photographs an image and output the photographed image to the controller 180. The camera 170 includes a front camera disposed at a front side of a terminal and a rear camera disposed at a rear side of the terminal.

The controller 180 controls overall operations of the videophone terminal 100 and signal flow between internal blocks of the videophone terminal 100. When a videophone call starts, the controller 180 extracts character images from a received image, and determines a speaker image of a received voice from the extracted character images. The function of the controller 180 is described below with reference to FIG. 2.

Figure 2:
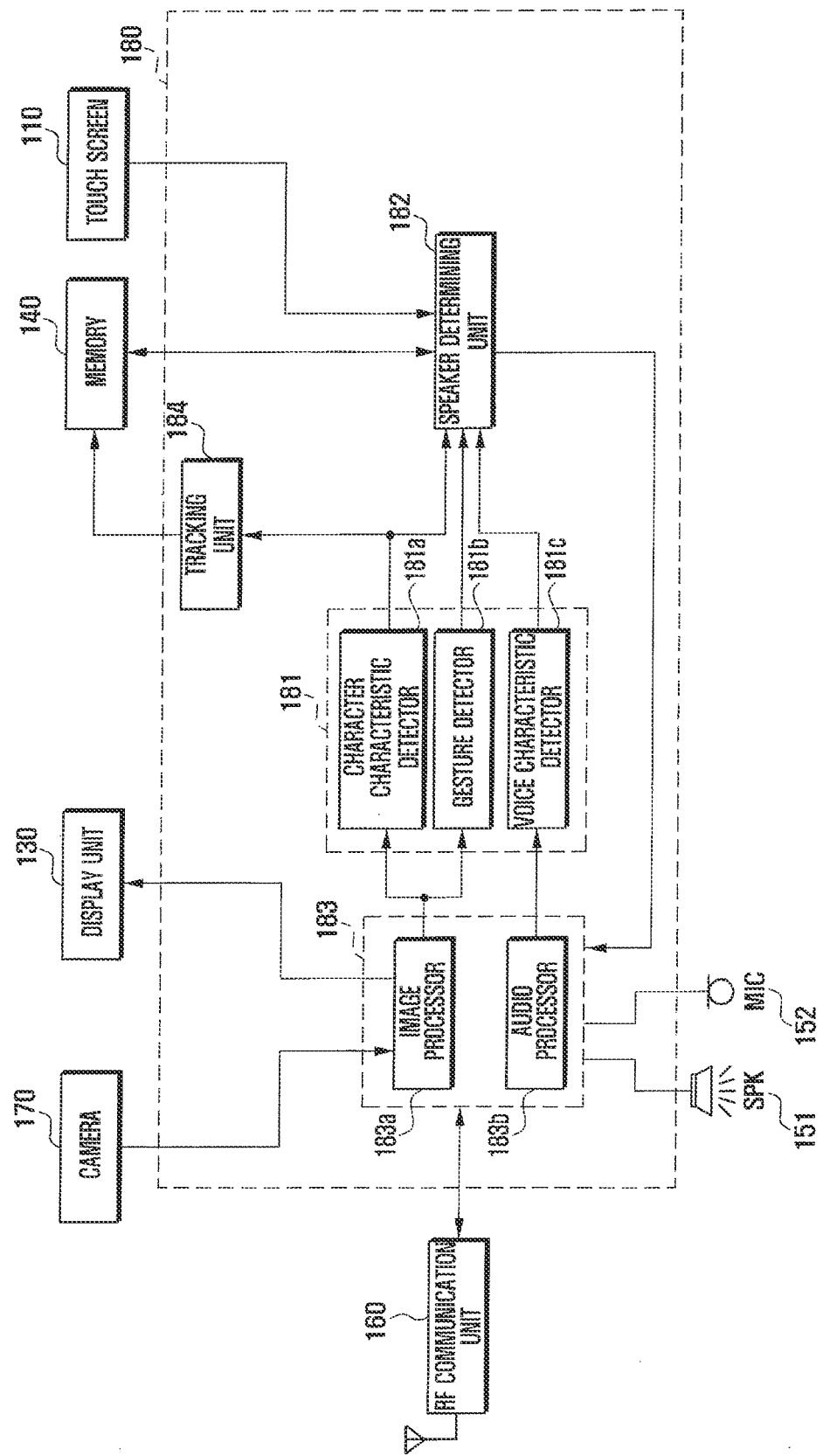
FIG. 2 is a block diagram illustrating a controller according to an exemplary embodiment of the present invention.

FIG. 2 is a block diagram illustrating a controller according to an exemplary embodiment of the present invention.

Referring to FIG. 2, the controller 180 includes a detecting unit 181, a speaker determining unit 182, a processing unit 183, and a tracking unit 184. The detecting unit 181 includes a character characteristic detector 181a, a gesture detector 181b, and a voice characteristic detector 181c.

The character characteristic detector 181a detects character images and characteristic information thereof from a received image from the image processing unit 183 using various detecting schemes, and transfers the character images and characteristic information to the speaker determining unit 182. In the detecting schemes, for example, the character characteristic detector 181a may detect edges of a character image, such as a discrete point of pixel brightness, to extract a character image from the received image. The character characteristic detector 181a may convert a format of the received image from RGB to YCbCr, and detect a skin region using Cb and Cr color components. The character characteristic detector 181 may gray-process or binarize the received image and performs template-matching the processed image to detect a face, a lip, and so on from the received image.

The gesture detector 181b may perform template-matching to detect a certain gesture from the received image and transfers the detected certain gesture to the speaker determining unit 182. In addition, the character characteristic information and the certain gesture may be detected by various detecting schemes. The voice characteristic detector 180c detects voice characteristic information from the received voice input from the processing unit 183 and transfers the detected voice characteristic information to the speaker determining unit 182.

The speaker determining unit 182 receives the character characteristic information, the certain gesture, and the voice characteristic information from the detector 181. The speaker determining unit 182 matches the voice characteristic information to character characteristic information and determines a corresponding character image of the character characteristic information mapped to the voice characteristic information as a speaker image of the received voice. The speaker determining unit 181 transfers and stores the voice characteristic information and the character characteristic information mapped thereto to the memory 140. When a videophone call is terminated, the speaker determining unit 181 may remove all character characteristic information stored in a character characteristic information DB 143 of the memory 140. The following is a detailed description of the speaker determining unit 182.

If the voice characteristic information is received from the voice characteristic detector 181c, the voice determining unit 182 searches the memory 140 for voice characteristic information mapped to the voice characteristic information. If the voice characteristic information exists in the memory 140, the voice determining unit 182 searches the memory 140 for character characteristic information mapped to the received voice characteristic information. When the character characteristic information exists in the memory 140, the speaker determining unit 182 determines a character image corresponding to the searched character characteristic information as a speaker image. The speaker determining unit 182 transfers character characteristic information of the speaker image to the image processing unit 183.

When voice characteristic information or character characteristic information corresponding to input voice characteristic information is not stored in the memory 140, the speaker determining unit 182 receives a certain gesture from the gesture detector 181b. When the certain gesture is received from the gesture detector 181b, the speaker determining unit 182 selects character characteristic information received from the character characteristic detector 181a based on the certain gesture, and matches the selected character characteristic information to voice characteristic information. The speaker determining unit 182 transfers and stores the voice characteristic information and character characteristic information mapped thereto to the memory 140. The speaker determining unit 182 transmits character characteristic information of a speaker image to the image processing unit 183.

The speaker may be manually determined. When voice characteristic information or character characteristic information mapped to the input voice characteristic information is not stored in the memory 140, the speaker determining unit 182 receives user input information from the touch screen 110. When the user input information is received from the touch screen 110, the speaker determining unit 182 selects character characteristic information received from the character characteristic detector 181a and matches the selected character characteristic information to voice characteristic information. The speaker determining unit 182 transfers and stored the voice characteristic information and character characteristic information mapped thereto to the memory 140. The speaker determining unit 182 further transmits character characteristic information of a speaker image to the image processing unit 183.

When character characteristic information is received from the character characteristic detector 181a, the speaker determining unit 182 compares the received character characteristic information with information in a character characteristic information DB 143. If information included in the received character characteristic information is not stored in the character characteristic information DB 143, the speaker determining unit 182 transfers corresponding character characteristic information to the image processing unit 183 to mask a non-registered character image. The speaker determining unit 182 displays a non-registered character image among the character images mapped to the voice characteristic information.

The speaker determining unit 181 may match the voice characteristic information with a certain address. For example, when character characteristic information is received from the detector 181 together with the voice characteristic information, the speaker determining unit 181 recognizes a connected call as a one-to-one videophone call. When only the voice characteristic information is received from the detecting unit 181, without the character characteristic information, the speaker determining unit 181 recognizes the connected call as a voice call. When the connected call is recognized as a one-to-one videophone call or a voice call, the voice determining unit 181 searches a contact address DB 141 to determine whether a phone number received from the RF communication unit 160 is stored in the contact address DB 141. When the received phone number is stored in the contact address DB 141, the speaker determining unit 181 matches voice characteristic information with a corresponding contact address. Matching of the contact address may be achieved by a menu operation of a user.

The processing unit 183 includes an image processor 183a and an audio processor 183b. The image processor 183a includes an encoder converting an analog image signal input from a camera 170 or the RF communication unit 160 into a digital signal, and a decoder converting a digital image signal into analog signal, and outputting the analog signal to the display unit 130 or the RF communication unit 160. If the image processor 183a receives character characteristic information of a speaker image from the speaker determining unit 181, the image processor 183a processes a received image to distinguish a speaker image from that of another image using the character characteristic information, and transfers the processed image to the display unit 130. Information received from the speaker determining unit 181 by the image processor 183 may contain a contact address, for example, a name of a speaker. The audio processor 183b includes an encoder converting an analog audio signal input from a microphone 152 or the RF communication unit 160 in a digital signal and a decoder converting a digital audio signal into an analog signal and outputting the converted analog signal to a speaker 151 or the RF communication unit 160. The audio processor 183b converts an analog audio signal input from the RF communication unit 160 in a digital signal and outputs the converted digital audio signal to the voice characteristic detector 181c.

The tracking unit 184 receives character characteristic information from the character characteristic detector 181a and tracks location variation thereof. The tracking unit 184 updates the character characteristic information stored in the character characteristic DB 142 by the location varied character characteristic information.

FIGS. 3A-3E are views showing a screen for illustrating a method for displaying a speaker according to a first exemplary embodiment of the present invention.

Figures 3A, 3B, 3C, 3D, 3E:
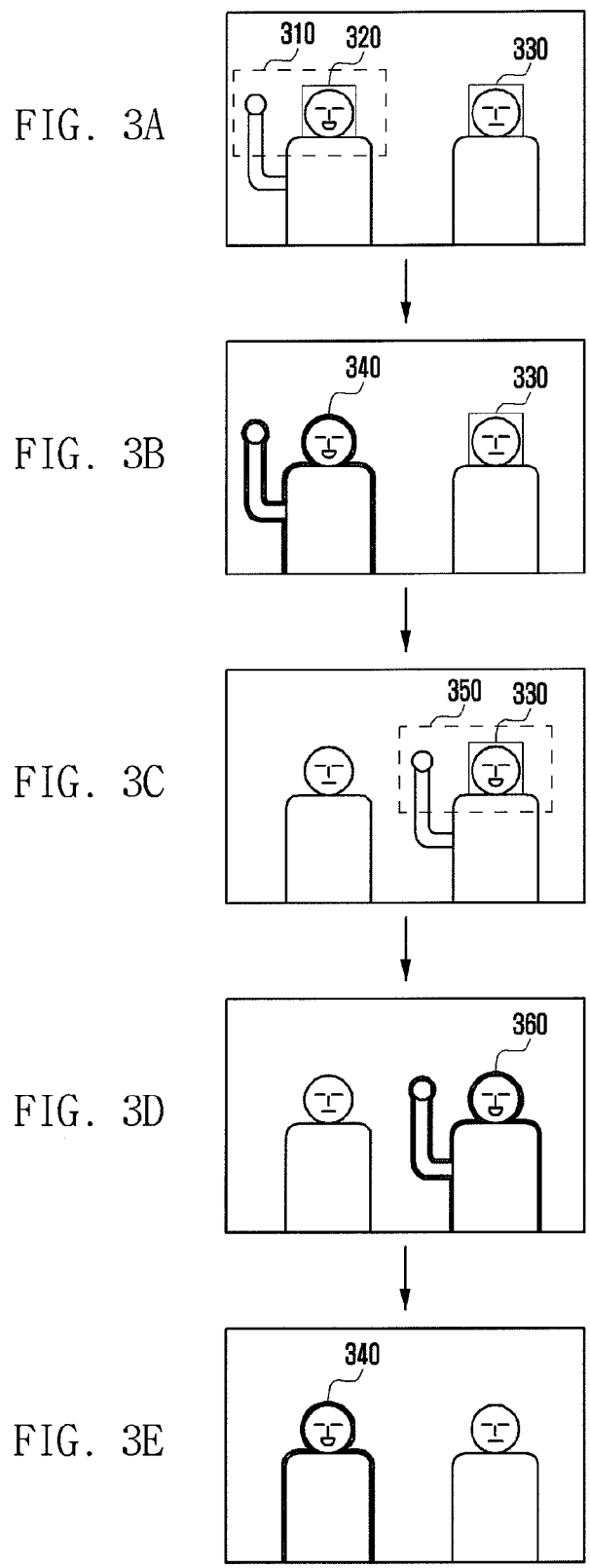
FIGS. 3A-3E are views showing a screen for illustrating a method for displaying a speaker according to a first exemplary embodiment of the present invention.

Referring to FIGS. 3A-3E, when a videophone call starts, the controller 180 detects character images and location information of a partial body thereof, such as a face. The controller 180 controls the display unit 130 to display contours 320 and 330 of the face as shown in FIG. 3A. The user views displayed contours 320 and 330 of the face, and requests another user to sequentially speak one by one in a state while the user lifts a finger. Accordingly, if a first speaker makes a certain gesture, the controller 180 detects voice characteristic information (first voice characteristic information) and the certain gesture (first certain gesture) of a first speaker, and controls the display unit 130 to display a contour 310 of the first certain gesture as shown in FIG. 3A.

The controller 180 determines a character image of character images including the first certain gesture as a first speaker image, detects location information of an entire contour from the first speaker image, and matches the detected location information of the entire contour with first voice characteristic information. The controller 180 transfers and stores the matched first voice characteristic information and detected location information to the memory 140. The controller 180 deletes a face contour of the first speaker and instead controls the display unit 130 to display an entire contour 340 of the first speaker as shown in FIG. 3B. If the first speaker stops speaking, the controller 180 stops display of the entire contour 340 because a voice is no longer received from the RF communication unit 160.

Next, a second speaker makes a certain gesture. Accordingly, the controller 180 detects voice characteristic information (second voice characteristic information) and the certain gesture (second certain gesture) of the second speaker, and controls the display unit 130 to display a contour 350 of the second certain gesture as shown in FIG. 3C. The controller 180 determines a second image based on the second certain gesture, detects location information of an entire contour from the second speaker image, and matches the detected location information of the entire contour with second voice characteristic information. Subsequently, the controller 180 transfers and stores the matched second voice characteristic information and location information in the memory 140. The controller 180 deletes a face contour of the second speaker and instead controls the display unit 130 to display an entire contour 360 of the second speaker as shown in FIG. 3D.

Display of a speaker is achieved without detecting a certain gesture. The controller 180 detects voice characteristic information from the receiving voice and searches the memory 140 for character characteristic information matching the detected voice characteristic information. The controller 180 determines a character image corresponding to the character characteristic information as a speaker image. The controller 180 controls the display unit 130 to display an entire contour 340 of the speaker as shown in FIG. 3E.

FIGS. 4A-4F are views showing a screen for illustrating a method for displaying a speaker according to a second exemplary embodiment of the present invention. For example, the first embodiment mentioned above determines a speaker based on the certain gesture, and the second embodiment determines a speaker based on user input information.

Figures 4A, 4B, 4C, 4D, 4E, 4F:
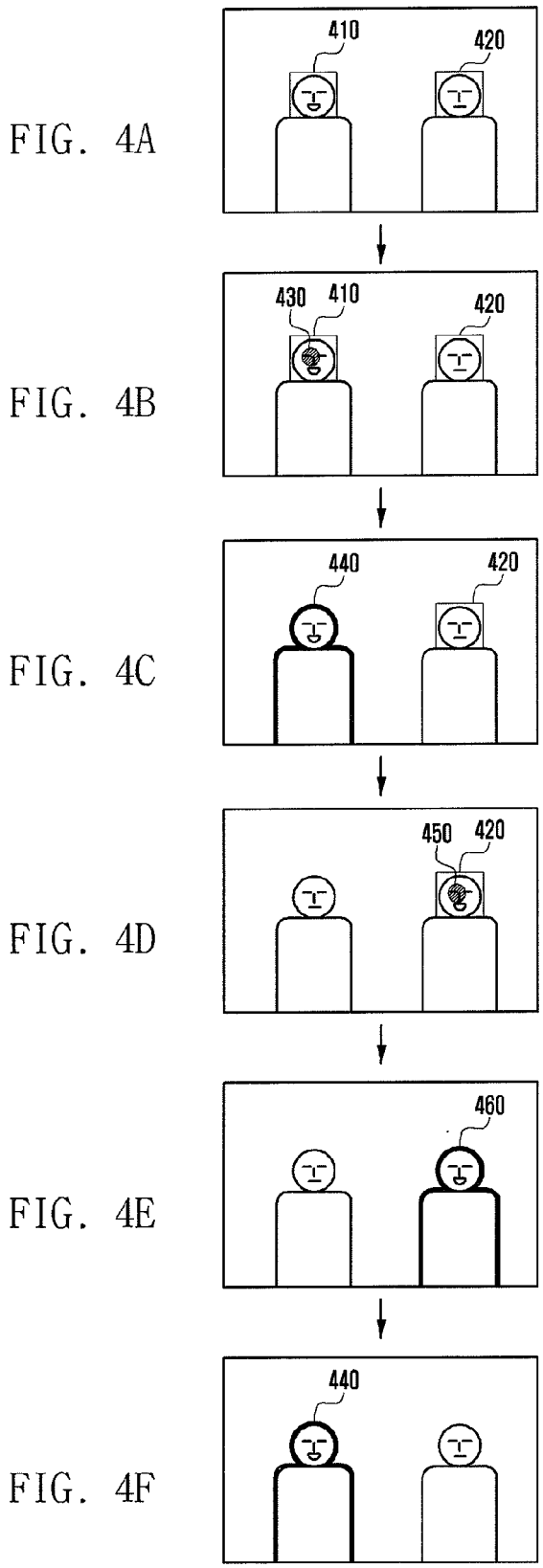
FIGS. 4A-4F are views showing a screen for illustrating a method for displaying a speaker according to a second exemplary embodiment of the present invention.

Referring to FIGS. 4A-4F, when a videophone call starts, the controller 180 detects character images and location information of a partial body thereof, such as a face. The controller 180 controls the display unit 130 to display contours 410 and 420 of the face as shown in FIG. 4A. The user touches one face 430 as shown in FIG. 4B. The user touches a first speaker image among displayed character images. Accordingly, a touch screen 110 transmits first touch information to the controller 180. If a voice is being received from an RF communication unit 160, the controller 180 determines the touched character image as a first speaker image, detects an entire contour from the first speaker image, and detects the first voice characteristic information from a first speaker voice. The controller 180 matches the detected location information of the entire contour with the first voice characteristic information. The controller 180 transfers and stores the two matched information to the memory 140. The controller 180 controls the display unit 130 to delete a face contour 410 of the first speaker and instead display the entire detected contour 440 of the first speaker image as shown in FIG. 4C.

Subsequently, as shown in FIG. 4D, the user touches a second speaker image 450. Accordingly, the touch screen 110 transmits second touch information to the controller 180. If a voice is being received from an RF communication unit 160, the controller 180 determines the touched character image as a second speaker image, detects an entire contour from the second speaker image, and simultaneously detects the second voice characteristic information of a second speaker. The controller 180 matches the detected location information of the entire contour with the second voice characteristic information. The controller 180 transfers and stores the two matched information to the memory 140. The controller 180 controls the display unit 130 to delete a face contour 420 of the second speaker and instead display the entire detected contour 460 of the second speaker image as shown in FIG. 4E.

Speaker display is achieved without touch operation. The controller 180 detects voice characteristic information from the received voice and searches character characteristic information matching the detected voice characteristic information from the memory 140. The controller 180 determines a character image corresponding to the searched character characteristic information as a speaker image. Subsequently, as shown in FIG. 4F, the controller 180 controls the display unit 130 to display an entire contour 440 of the speaker.

Figure 5:
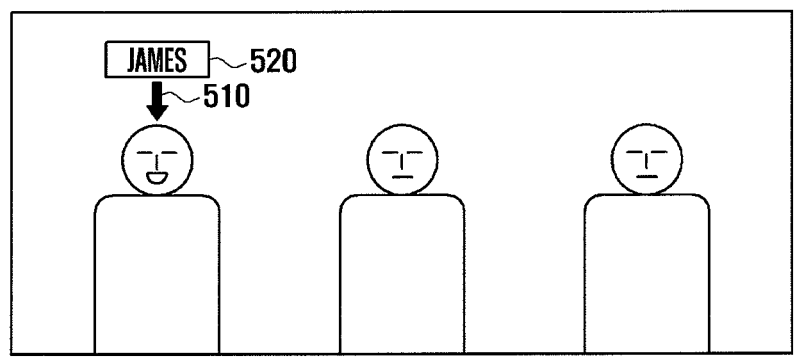
FIG. 5 is a view showing a screen for illustrating a method for displaying a speaker according to a third exemplary embodiment of the present invention.

FIG. 5 is a view showing a screen for illustrating a method for displaying a speaker according to a third exemplary embodiment of the present invention.

Referring to FIG. 5, the controller 180 may control the display unit 130 to display a mark 510 on a speaker image. The controller 180 may control the display unit 130 to display contact address information 520 on the speaker image.

Figure 6:
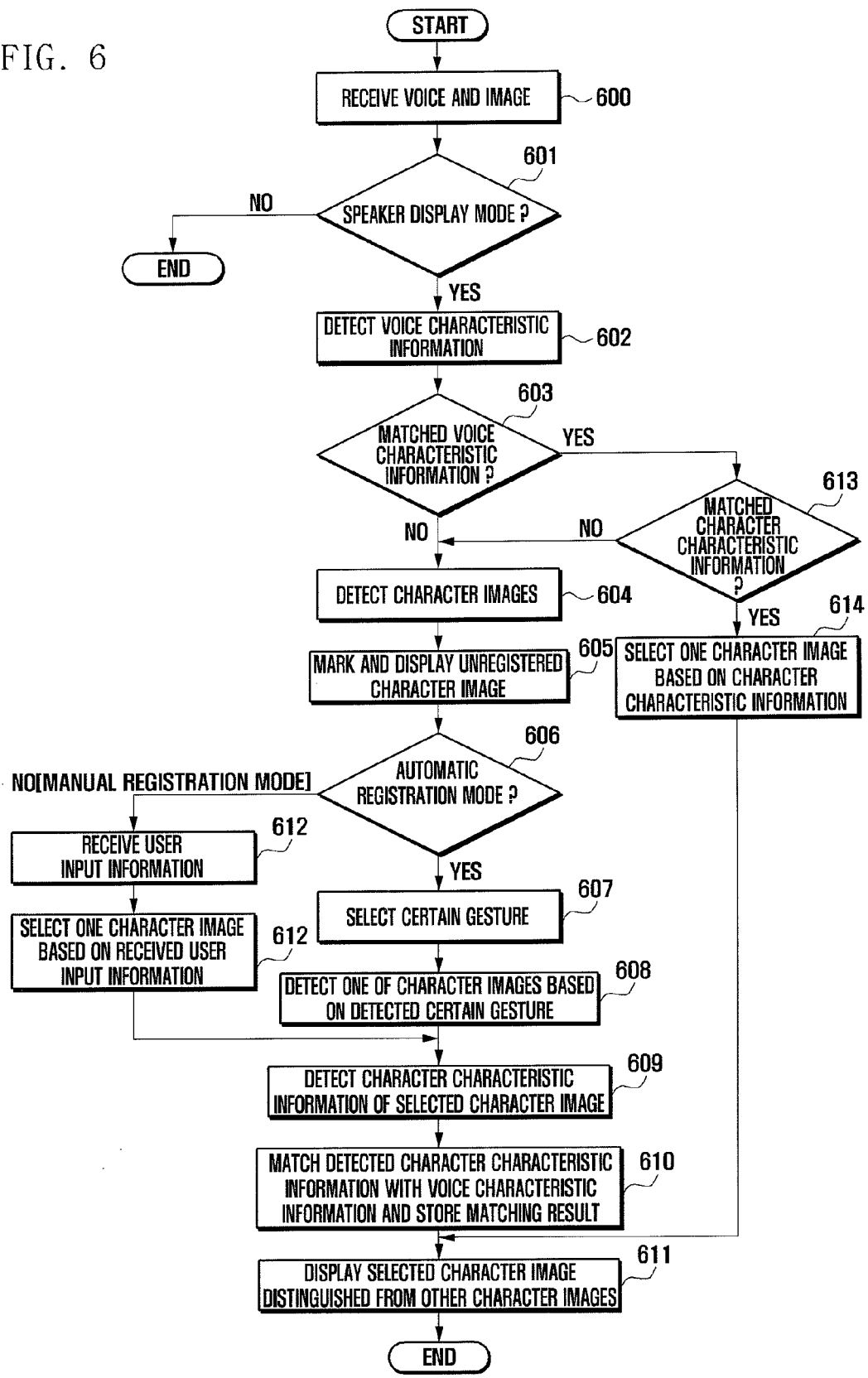
FIG. 6 is a flowchart illustrating a method for displaying a speaker according to a fourth exemplary embodiment of the present invention.

FIG. 6 is a flowchart illustrating a method for displaying a speaker according to a fourth exemplary embodiment of the present invention.

Referring to FIG. 6, when a videophone call starts, the controller 180 receives a voice and an image from the RF communication unit 160 in step 600. The controller 180 determines whether the videophone terminal 100 is set to a speaker display mode by referring to a display mode set value stored in a memory 130 in step 601.

When the videophone terminal 100 is set to the speaker display mode in step 601, the controller 180 detects voice characteristic information from the received voice in step 602. The controller 180 determines whether voice characteristic information matching the detected voice characteristic information exists in the memory 140 in step 603. When the matched voice characteristic information does not exist in step 603, the controller 180 detects character images from the received image in step 604. The controller 180 controls the display unit 130 to mark and display an unregistered character image in step 605. Contents related to the unregistered character image are described above with reference to FIG. 2.

The controller 180 determines whether the videophone terminal 100 is set to an automatic registration mode by referring to a registration mode set value stored in the memory 140 in step 606. When the videophone terminal 100 is set to the automatic registration mode, the controller 180 detects a certain gesture from the received image in step 607. The controller 180 selects a character image based on the detected certain gesture in step 608, and detects character characteristic information of the selected character image in step 609. The controller 180 matches the detected character characteristic information with voice characteristic information and stores the matching result in the memory 140 in step 610. The controller 180 controls the display unit 130 to display the selected character image distinguished from other character images in step 611.

When the videophone terminal 100 is set to a manual registration mode in step 606, the controller 180 receives user input information from a touch screen 110 or a key input unit 120 in step 612. The controller 180 selects one of the character images based on the received user input information and proceeds to step 609.

When the voice characteristic information matching with the detected voice characteristic information exists in the memory 140 in step 603, the controller 180 determines whether character characteristic information matching the detected voice characteristic information exists in the memory 140 in step 613. When the character characteristic information matching the detected voice characteristic information does not exist in the memory 140, the controller 180 proceeds to step 604. When character characteristic information matching the detected voice characteristic information exists in the memory 140, the controller 180 selects one of the character images based on character characteristic information matching the detected voice characteristic information and then proceeds to step 611.

A videophone terminal 100 according to an exemplary embodiment of the present invention displays a speaker and simultaneously displays a variety of information regarding the speaker, for example, a message list exchanging with the speaker, a call list with the speaker, and Social Network Service (SNS) information related to the speaker. A method for displaying a speaker is described below with reference to FIG. 7 to FIG. 10.

FIG. 7 to FIG. 10 are views showing screens for illustrating a method for displaying a speaker according to a fifth exemplary embodiment of the present invention.

The controller 180 controls a display unit 130 to display a name of a speaker and an arrow mark on a speaker image. If a screen division screen is input from a key input unit 120, the controller 180 controls the display unit 130 to divide a screen into a main screen region 710 and a sub screen region 720, to display a videophone call screen 730 on the main screen region 710, and to display an icon for executing an application on the sub screen region 720. For example, the controller 180 may control the display unit 130 to display a message list icon 740, a twitter icon 750, a call list icon 760, and a search engine icon 770 on the sub screen region 720.

Figure 7:
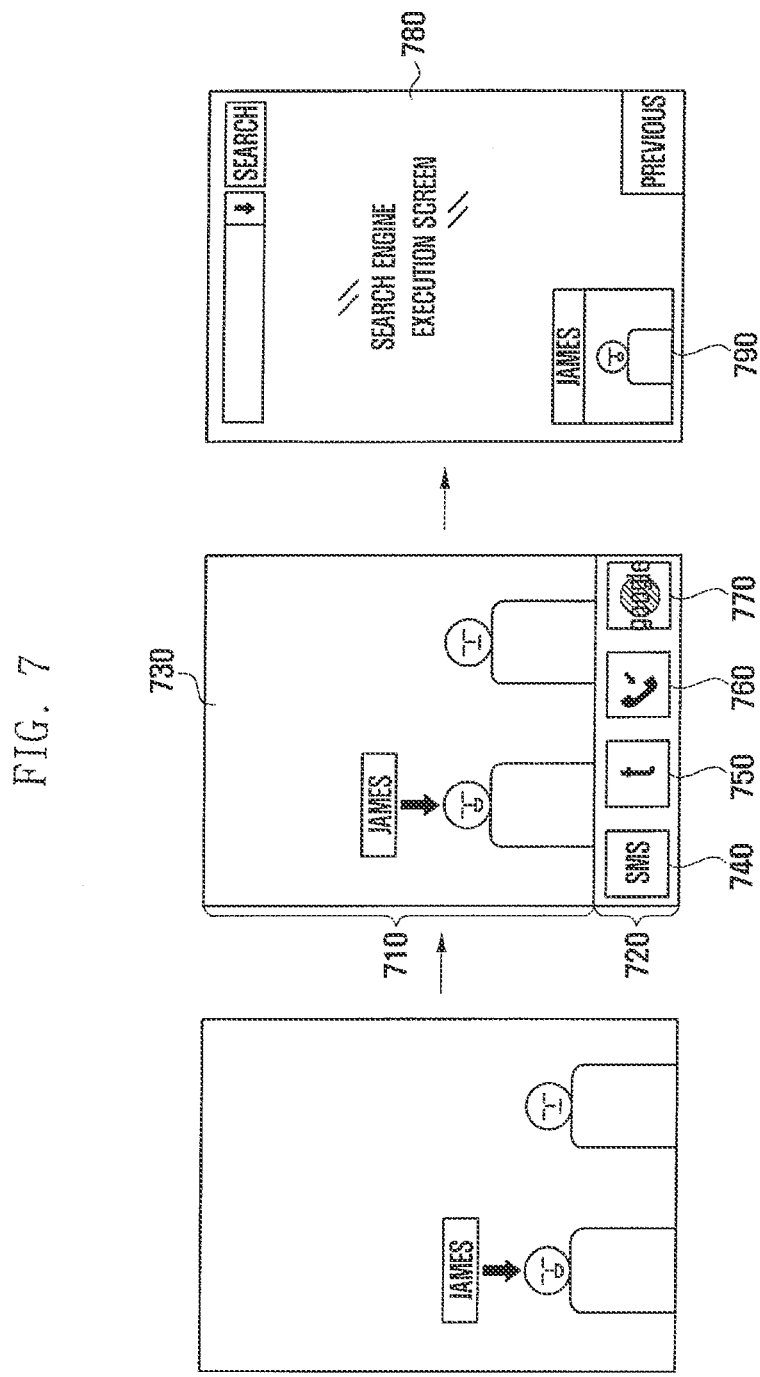
FIG. 7 to FIG. 10 are views showing screens for illustrating a method for displaying a speaker according to a fifth exemplary embodiment of the present invention.
Figure 8:
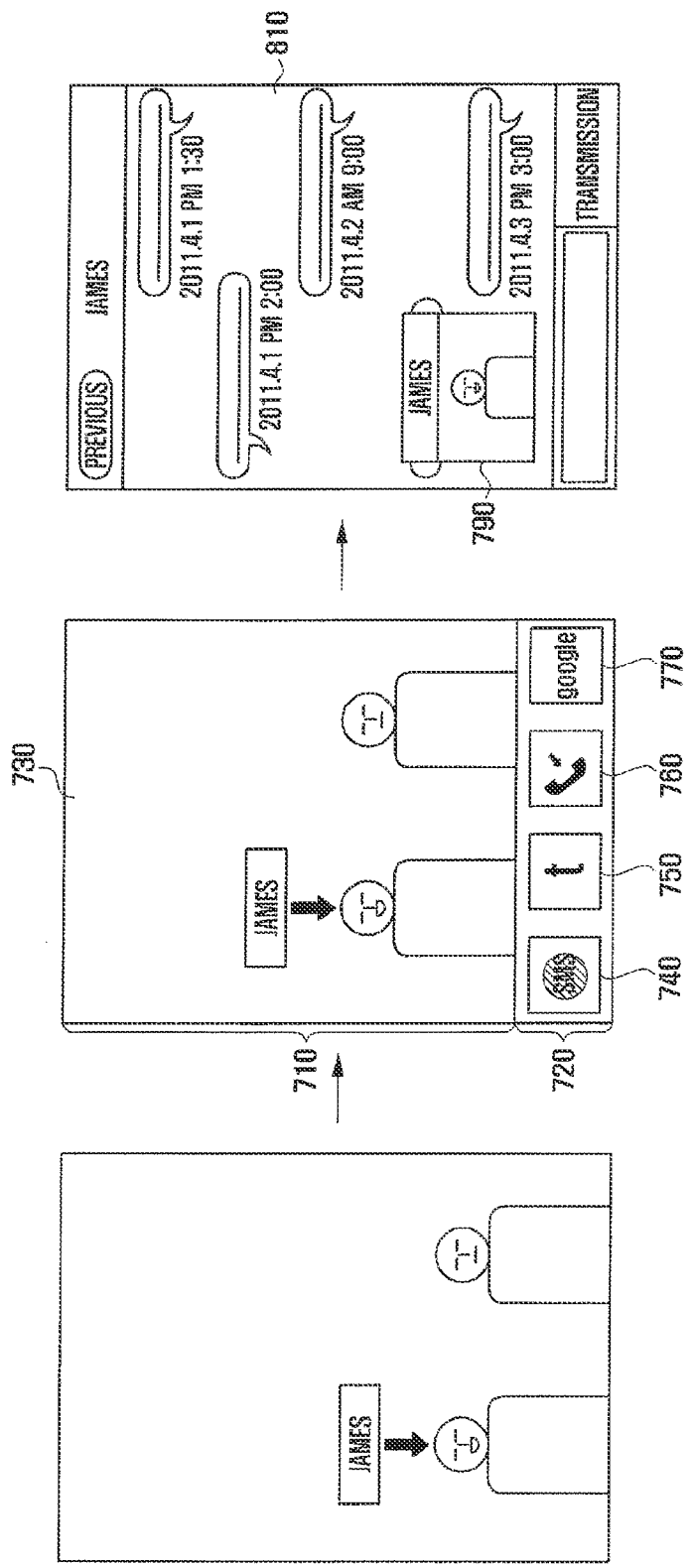
Figure 9:
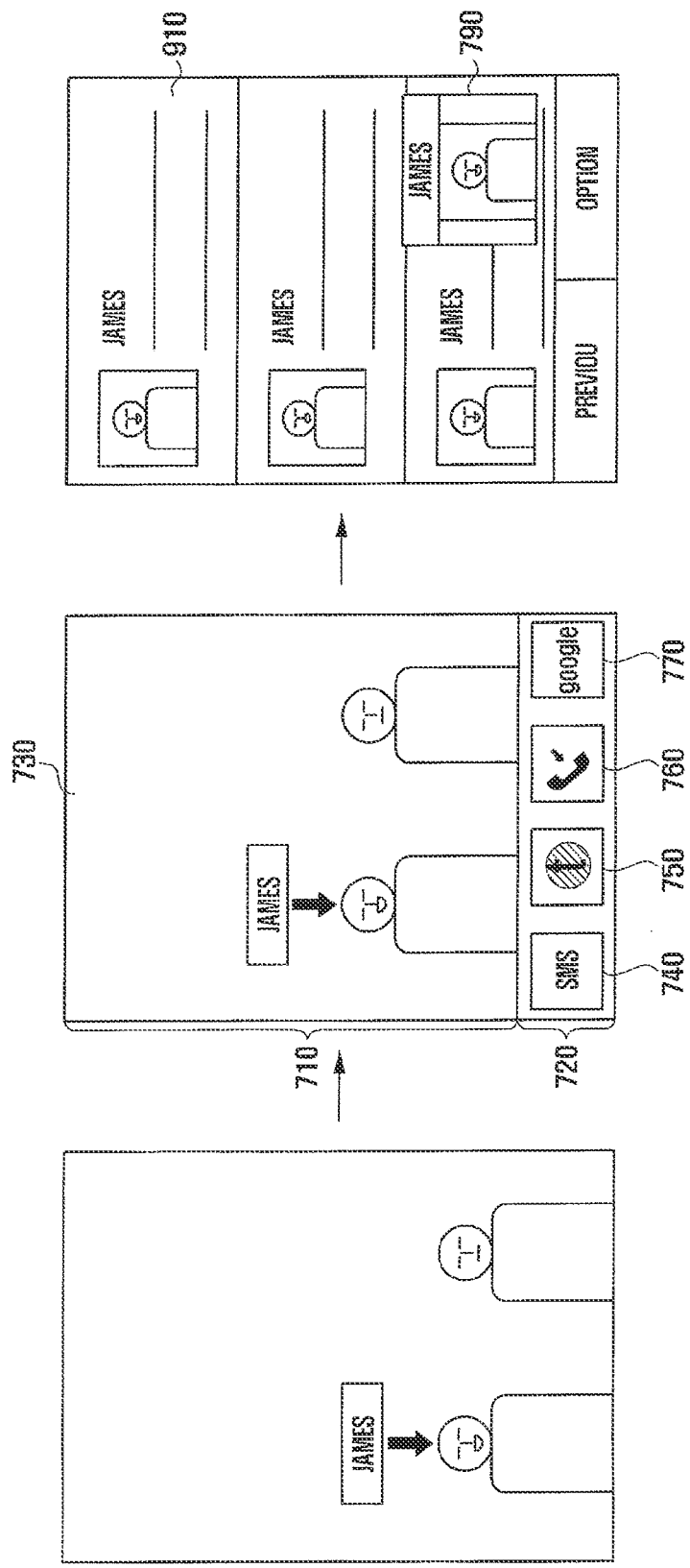
Figure 10:
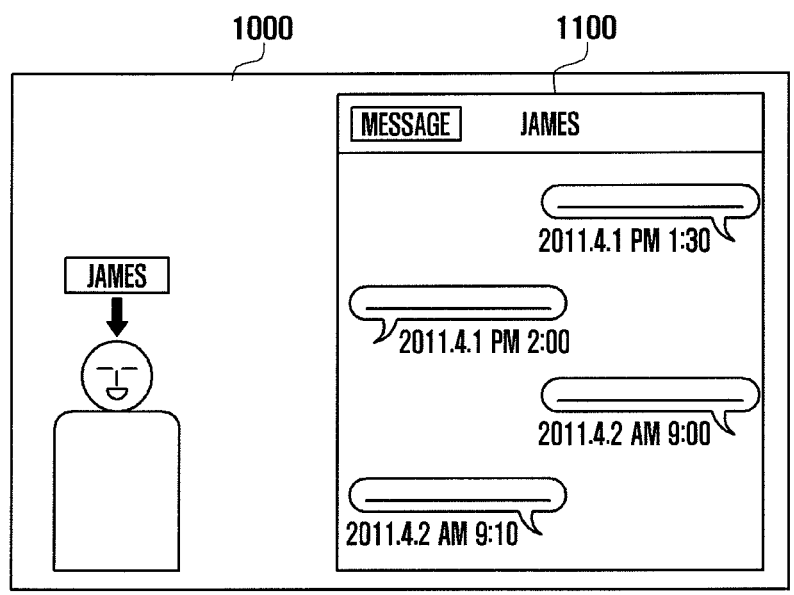

While the screen is divided, if the user touches and drops the search engine icon 770, the touch screen 110 transfers user input information related thereto to the controller 180. Accordingly, the controller 180 controls the display unit 130 to display a search engine execution screen 780 and to display a speaker image 790 above it as shown in FIG. 7. Accordingly, the user may perform a search while simultaneously having a conversation with the speaker via videophone. If the user touches and drops the message list icon 740, the touch screen 110 transfers user input information related thereto to the controller 180. Accordingly, the controller 180 controls the display unit 130 to display a message list 810 exchanging with a speaker and to display a speaker image 790 above it. If the user touches and drops the twitter icon 750, the touch screen 110 transfers user input information related thereto to the controller 180. Accordingly, the controller 180 controls the display unit 130 to display a recent tweet 910 of a speaker and to display a speaker image 790 above it as shown in FIG. 9. As shown in FIG. 10, the controller 180 may display information 1100 regarding the speaker above the videophone call screen 1000.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A speaker display method of a videophone terminal, the method comprising:
matching each of a plurality of voice characteristic information to one of a plurality of character images in a one-to-one correspondence and storing a result of the matching in a memory;
receiving an image and a voice from a communication unit;
detecting voice characteristic information and character images from the received voice and the received image, respectively;
searching character characteristic information corresponding to the voice characteristic information from the memory;
selecting one character image corresponding to the searched character characteristic information from the plurality of character images stored in the memory; and displaying the selected character image as distinguished from other character images.

2. The method of claim 1, wherein the detected voice characteristic information and the searched character characteristic information are tone information and location information, respectively.

3. The method of claim 1, wherein the displaying of the selected character image comprises displaying a contour of a character image matching with the detected voice characteristic information.

4. A videophone terminal comprising:
a communication unit configured to receive an image and a voice;
a controller configured to match each of a plurality of voice characteristic information to one of a plurality of character images in a one-to-one correspondence;
a memory configured to store a result of the matching performed by the controller; and
a display unit configured to display data associated with a videophone call;
wherein the controller is further configured to:
detect voice characteristic information and character images from the received voice and the received image, respectively,
search character characteristic information corresponding to the voice characteristic information from the memory,
select one character image corresponding to the searched character characteristic information from the plurality of character images stored in the memory; and
control the display unit to display the selected character image as distinguished from other character images.

5. The videophone terminal of claim 4, wherein, when the character characteristic information corresponding to the voice characteristic information is not found in the memory, the controller is further configured to:
detect a gesture from the received image,
select one of the character images based on the gesture,
detect character characteristic information from the one of the character images, and
map the voice characteristic information to the detected character characteristic information.

6. The videophone terminal of claim 5, wherein the controller is further configured to mark an unregistered character image when the character characteristic information matching the voice characteristic information is not found in the memory,
wherein the unregistered character image is an image of which character characteristic information is not stored in the memory.

7. The videophone terminal of claim 4, wherein the display unit is further configured to display a contour of the selected image.

8. The videophone terminal of claim 4, wherein the controller is further configured to detect tone information from the received voice and detects location information of a character image from the received image.

9. The videophone terminal of claim 4, wherein the display unit includes a touchscreen for receiving a user input,
wherein, in response to the user input, the controller controls the display unit to display a divided screen including a main screen and a sub screen, controls the display unit to display the at least one character image in the main screen, and controls the display unit to display at least one application icon in the sub screen.

10. The videophone terminal of claim 9, wherein, in response to the user input corresponding to one of the at least one application icon, the controller controls the display unit to display information corresponding to the at least one application icon and the speaker image.

* * * * *